United States Patent [19]

Sugawara

[11] Patent Number: 5,018,201
[45] Date of Patent: May 21, 1991

[54] SPEECH RECOGNITION DIVIDING WORDS INTO TWO PORTIONS FOR PRELIMINARY SELECTION

[75] Inventor: Kazuhide Sugawara, Tokyo, Japan

[73] Assignee: International Business Machines Corporation, Armonk, N.Y.

[21] Appl. No.: 278,055

[22] Filed: Nov. 30, 1988

[30] Foreign Application Priority Data

Dec. 4, 1987 [JP] Japan ................................ 62-306091

[51] Int. Cl.⁵ ............................ G10L 9/00; G10L 5/06
[52] U.S. Cl. ........................................ 381/43; 381/41
[58] Field of Search ................................. 381/41–50; 364/513.5

[56] References Cited

U.S. PATENT DOCUMENTS

| 4,513,436 | 4/1985 | Nose et al. | 381/43 |
| 4,625,287 | 11/1986 | Matsuura et al. | 381/41 |
| 4,718,093 | 1/1988 | Brown | 381/43 |
| 4,718,094 | 1/1988 | Bahl et al. | 381/43 |
| 4,837,831 | 6/1989 | Gillick et al. | 381/43 |

FOREIGN PATENT DOCUMENTS 0181167 5/1986 European Pat. Off.
0266423 5/1988 European Pat. Off.

OTHER PUBLICATIONS

Matsuda et al., "A Method for Recognizing Japanese Monosyllables by Using Intermediate Cumulative Distance", Proceedings of the IEEE ICASSP, ICASSP'84, vol. 1, 19th–21st Mar. 1984, pp. 9.3.1–9.3.4.

Loeb, E. P. et al. "Experiments in Isolated Digit Recognition with a Cochlear Model." *Proc. ICASSP '87*, Apr. 1987, pp. 1131–1134.

Watanuki, O. et al. "Speaker Independent Isolated Word Recognition Using Label Histograms." *Proc. ICASSP'86*, Apr. 1986, pp. 2679–2682.

*Primary Examiner*—Gary V. Harkcom
*Assistant Examiner*—David D. Knepper
*Attorney, Agent, or Firm*—Marc D. Schechter

[57] ABSTRACT

A speech recognition apparatus makes a preliminary selection of a number of candidate words from a vocabulary of words, one of which candidate words is most likely the spoken word to be recognized. For the preliminary selection, each candiate word is divided into first and second portions. For each portion of a word, there are stored probabilites of producing each label of a label alphabet during the utterance of that portion of the word. The speech to be recognized is also divided into first and second portions. A label string representing the speech to be recognized is generated, such that labels occur during the first or the second portion of the speech (or during a transition between the first and second portions. To determine the likelihood that the spoken word represents a word from the vocabulary, each label occurring during the first portion is assigned its "first portion" probability. Each label occurring during the second portion is assigned its "second portion" probability.

8 Claims, 6 Drawing Sheets

SPEECH RECOGNITION DIVIDING WORDS INTO TWO PORTIONS FOR PRELIMINARY SELECTION

BACKGROUND OF THE INVENTION

The present invention relates to a speech recognition apparatus, and more particularly to an apparatus capable of stable preliminary selection of candidate words with a high speed and a high accuracy.

In a speech recognition apparatus based upon Markov models, a preprocessing analyzes an inputted speech for a series of short constant time intervals hereinafter called frames (for example, about 12 milliseconds each), and generates a label string corresponding to the inputted speech. As the preliminary selection method adapted to the system, the Polling Fast Match method using one-state Markov models has been well known (see published Japanese Patent Application No. 62-220996 or U.S. Pat. No. 4,718,094). This method previously determines the probability of producing each label in the label alphabet (a label set) at an arbitrary frame of each word included in a vocabulary, accumulates the probability corresponding to each word in accordance with each label of the label string of the inputted speech to be recognized, and selects the candidate words from the vocabulary on the basis of the accumulated value for each word. These selected words are then more finely matched with the inputted speech.

Since this Polling Fast Match method, however, utilizes no time information, a word having an end portion similar to the head portion of the uttered word is erroneously judged as a candidate, resulting in degradation of recognition accuracy.

Other prior art is disclosed in papers entitled "Speaker Independent Isolated Word Recognition Using Label Histograms", by O. Watanuki and T. Kaneko (*Proceedings of ICASSP '86*, pp. 2679–2682, April, 1986), and "Experiments in Isolated Digit Recognition with a Cochlear Model", by Eric P. Loeb and Richard F. Lyon, (*Proceedings of ICASSP '87*, pp. 1131–1134, April, 1987).

In the former technique, the probability of producing each label in the label alphabet in an arbitrary frame of the block is previously determined for each of the N-divided blocks of the word included in the vocabulary, and the label string of the unknown inputted speech is divided into N sections. The probability for each word is accumulated in accordance with each label of the label string and the block including the label. The word having the maximum accumulated value is determined as the recognition word.

In the latter technique, similar processing with N=2 is carried out.

In these techniques, the division of the inputted speech into N or 2 sections cannot be performed until the completion of the inputted speech, making it difficult to perform real time processing. Furthermore, they are impaired by a fluctuation in the time direction since they have no smoothing processing in the time direction between the blocks.

It is to be noted here that the two techniques described above relate to speech recognition, and not to a preliminary selection of candidate words.

SUMMARY OF THE INVENTION

It is an object of the present invention to provide a speech recognition apparatus capable of high speed preliminary selection of candidate words on the basis of time information with a high accuracy even before the completion of the inputting of the speech.

It is another object of the invention to provide a speech recognition apparatus capable of preliminary selection of candidate words, and capable of suppressing the instability due to the utterance fluctuation in the time direction.

In order to achieve the above objects, the present invention determines in advance the probability of producing each label in the label alphabet in an arbitrary frame in a fixed length first half portion and a remaining second half portion of each word included in the vocabulary. While an unrecognized speech is inputted during the fixed first portion, the label producing probabilities relative to the labels in the first portion are accumulated. After that the corresponding label producing probabilities relative to the second portion are accumulated. Thus, the processing may be performed without waiting for the completion of the input of the unknown speech.

Furthermore, at the time of determining the label producing probabilities for the first half portion and the remaining second half portion of the word based upon the training speech, statistical information is obtained by using weights for smoothing in the time direction so as to absorb the utterance fluctuation in the time direction.

As described above, according to the present invention, the fixed length first half portion and the remaining second half portion of the utterance are estimated by individual score tables, thereby realizing the use of time information and frame synchronized processing. Moreover, since the smoothing in the time direction is performed in preparing the score tables, stable preliminary selection of candidate words under utterance fluctuation in the time direction may be realized.

DESCRIPTION OF THE PREFERRED EMBODIMENTS

Figure 1:
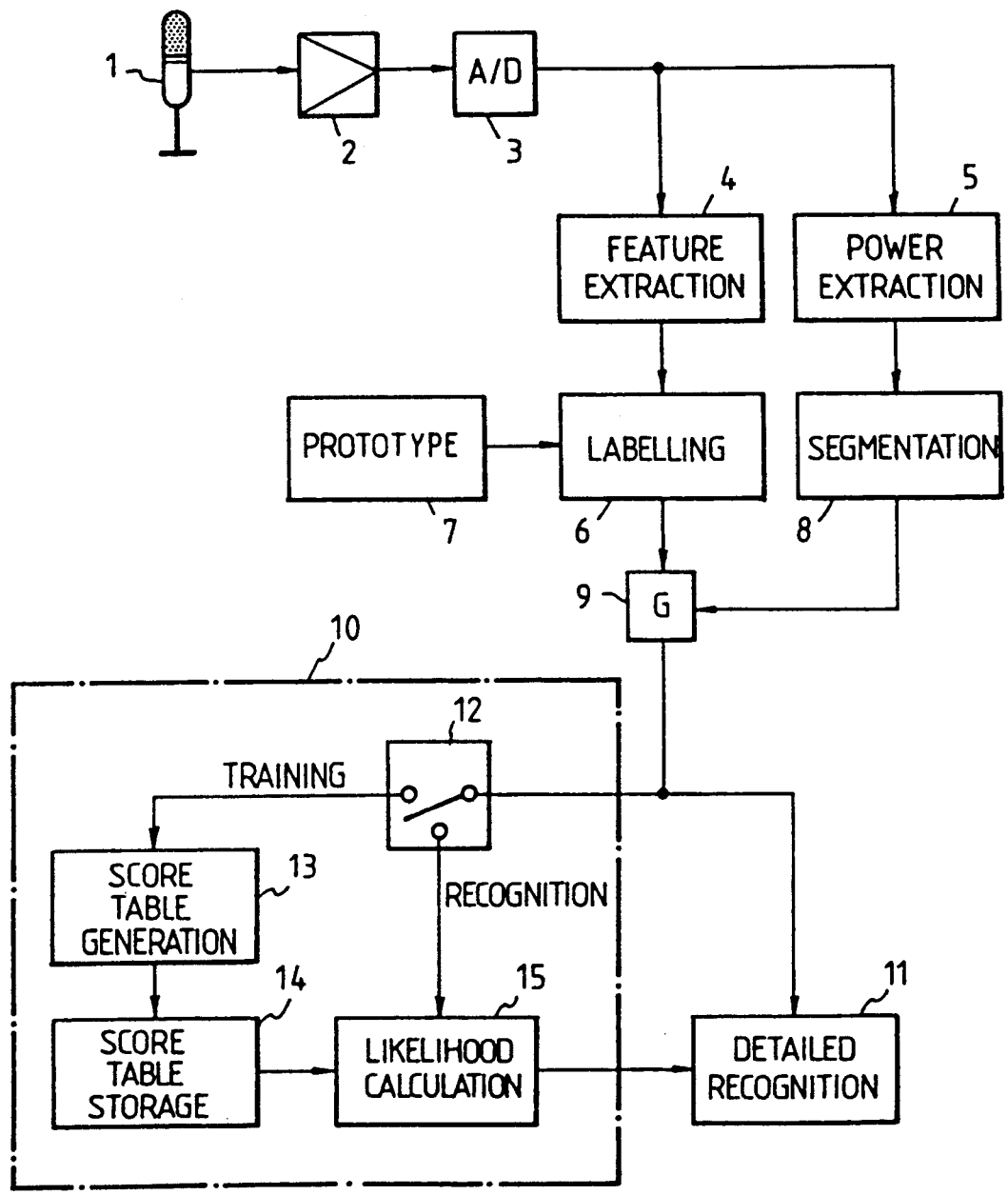
FIG. 1 shows a block diagram representing one embodiment of the invention.

FIG. 1 shows the overall construction of this embodiment. In FIG. 1, a speech data signal is inputted to an analog/digital (A/D) converter 3 from a microphone 1 and an amplifier 2 to obtain a digital data signal. The digitized speech data signal is supplied to a feature extraction block 4 and a power extraction block 5 to extract feature and power information from the speech data signal. A feature signal is fed to a labeling block 6 and is converted into a label signal with reference to a label prototype dictionary 7. The label prototype signals in the dictionary 7 are made by clustering and their number is, for example, thirty-two (32).

Figures 2, 3:
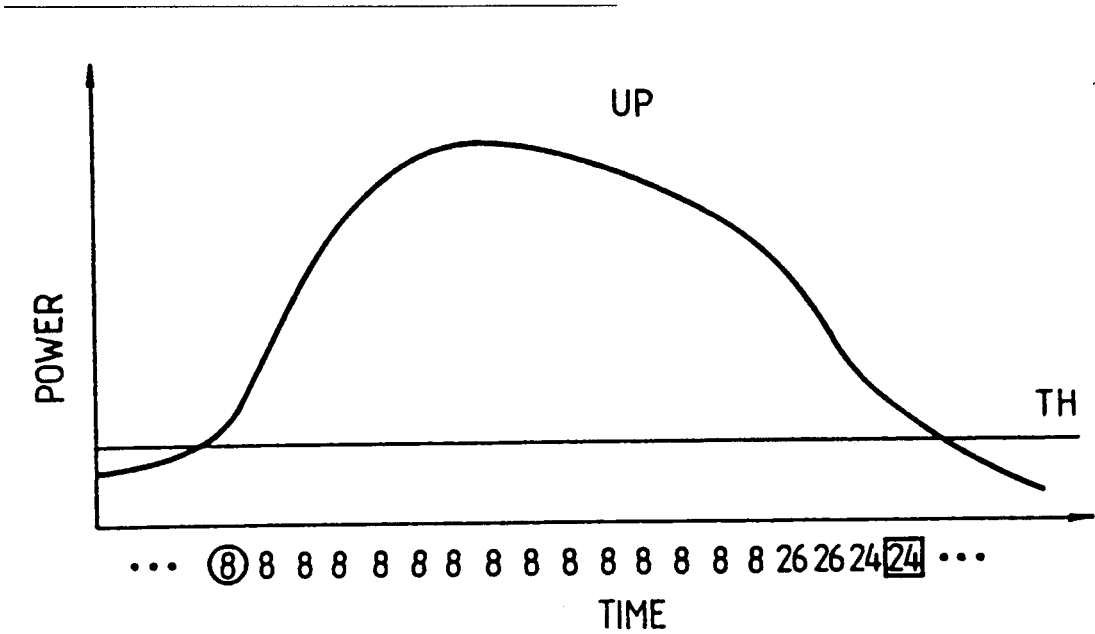
FIG. 2 is a timing chart explaining the word cut-out circuit of FIG. 1.
FIG. 3 is a drawing of a portion of a score table generated by the score table generation portion of FIG. 1.

The power data signal from the power extraction block 5 is fed to a word segmentation block 8 where frames of a leading edge and a trailing edge of the word are detected based upon the power data. In this detection, as shown in FIG. 2, for example, frames immediately after and before the time point when the power data UP of the utterance exceeds and falls below a threshold value TH are interpreted as the leading edge frame (surrounded with a circle) and the trailing edge frame (surrounded with a square), respectively. FIG. 2 shows an example of the utterance "en". A numerical train indicates a string of label numbers corresponding to the utterance "en".

The word segmentation block 8 supplies a gate signal to a gate circuit 9 in response to the frame detection of the head and end portions of the word, and supplies the string of label signals corresponding to the utterance to the next stage.

The label signal string is fed to a preliminary selection block 10 and a detailed recognition block 11. The preliminary selection block 10 comprises a switching circuit 12, a score table signal generation block 13, a score table signal storage 14 and a likelihood calculation signal block 15. The switching circuit 12 supplies the label signal string to the score table generation block 13 or the likelihood calculation block 15 during training or recognition, respectively.

The score table generation block 13 generates for each word a score table T1 for the first half portion of the word as shown in FIG. 3 and a similar score table T2 (not shown) for the second half portion of the word and stores them in the score table storage 14. The details of the generation of the score tables T1 and T2 will be explained later, referring to FIG. 4. As is clearly understandable from the example of FIG. 3, the score table T1 stores signals representing the probability of producing each label for the first half portion of each word. For example, "0.08" in row 1 and column 1 of score table T1 indicates that the probability of producing the label 1 in an arbitrary frame in the first half portion of the word 1 is 0.08. The first half portion of the word is a fixed length portion having 15 frames. The second half portion is the remaining portion of the word.

The likelihood calculation block 15 determines the degree of similarity of the inputted speech for each of the words on the basis of the score tables T1 and T2 of the respective words in the score table memory storage 14. Block 15 discriminates the most similar M candidate words and supplies discriminated data signals to the detailed recognition block 11. The detailed recognition block 11 matches the label signal string of the inputted speech with the Markov model of each of the M candidate words in accordance with, for instance, the Viterbi algorithm, and outputs the most similar candidate word as a recognition signal.

Next, the score table generation block 13 in FIG. 1 will be explained.

Figure 4:
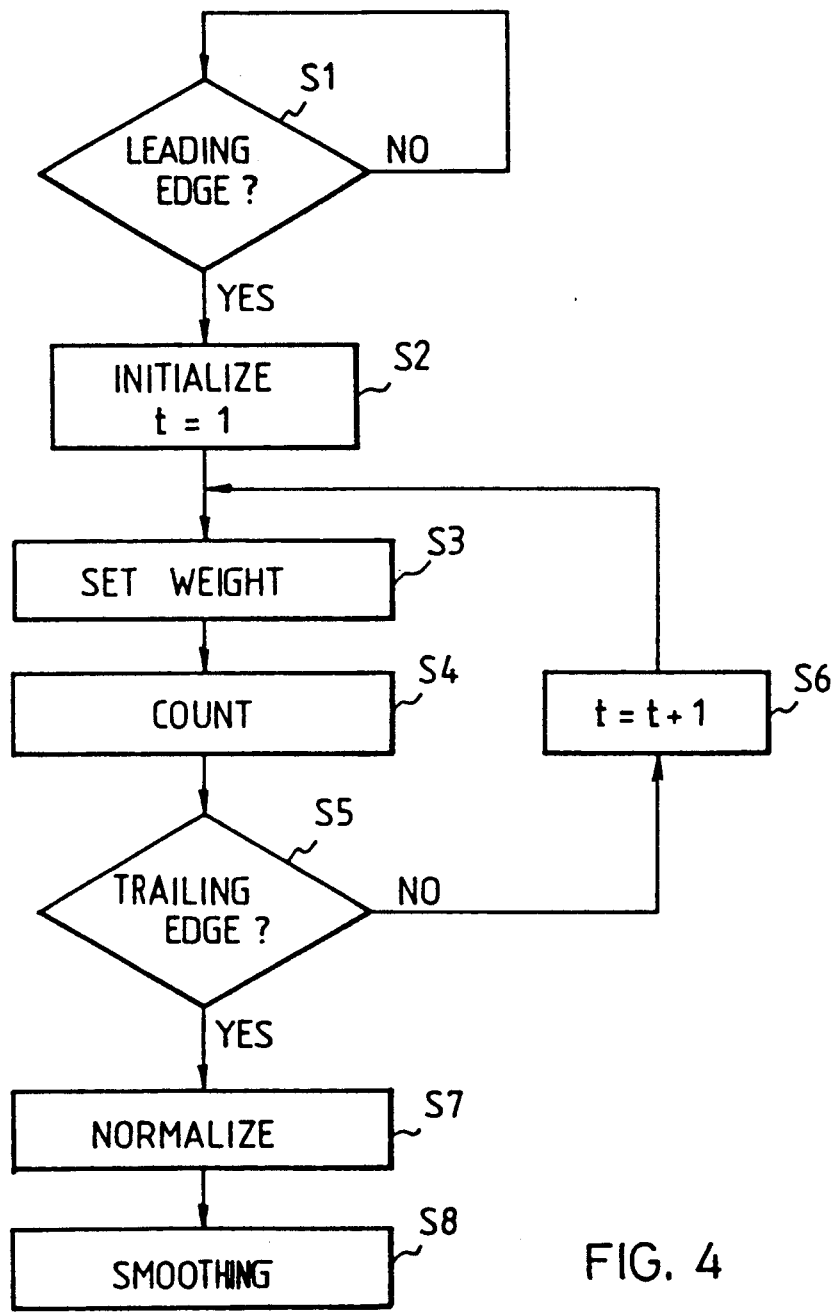
FIG. 4 is a flow chart explaining the operation of the score table generation portion.

The score table generation block 13 generates the score tables T1 and T2 by performing the procedure shown in FIG. 4. This procedure is carried out for each word k in the vocabulary. Referring to FIG. 4, step S1 prepares for detection of the head (beginning) of a word. An initialization is performed for all of the label numbers i (i=0-31) so as to set the COUNT1(k, i) and the COUNT2(k, i) for the first and second half portions of the word k to zero. The frame number t (t=1, 2, ... ) is set to 1 in response to the word head detection (step S2).

Subsequently, in step S3 weight signals W1 and W2 for the first and second half portions, respectively, of the word are set in accordance with a frame number t. These weights W1 and W2 are set as shown in Table I, below, and FIG. 5.

TABLE I

| Weight Distribution According to Frame Number | | |
|---|---|---|
| t ≦ 10<br>Totals for score<br>table T1 | 10 < t ≦ 20<br>Totals for both<br>score tables T1 and T2 | 20 < t<br>Totals for score<br>table T2 |
| W1 = 1 | W1 = $\frac{20 - t}{10}$ | W1 = 0 |
| W2 = 0 | W2 = $\frac{t - 10}{10}$ | W2 = 1 |

Figures 5, 6:
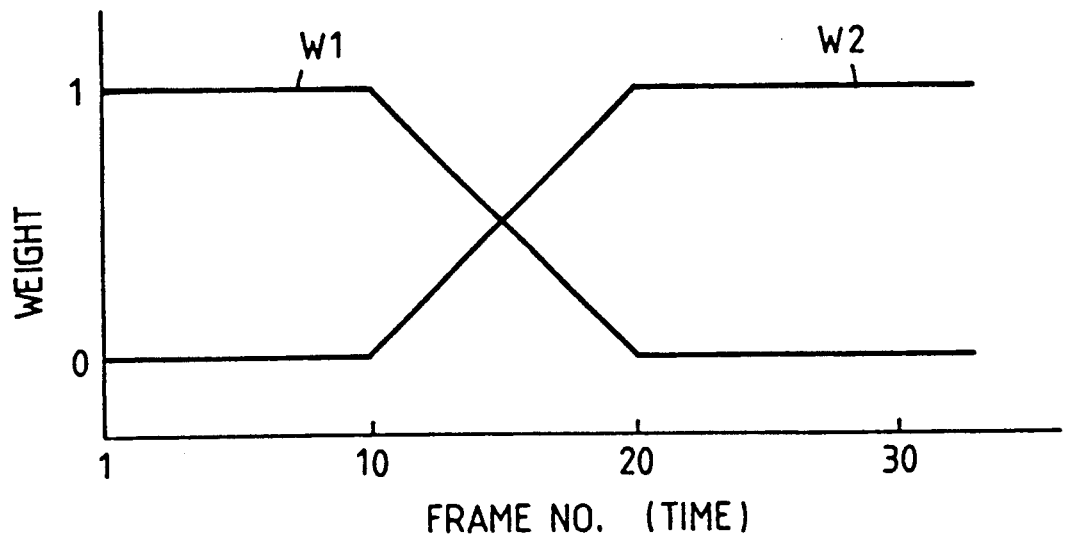
FIG. 5 is a plot of weighting factors versus frame count.
FIG. 6 is a smoothing matrix between the labels in the score table generation portion.

As shown in Table I and FIG. 5, the labels of frames 10 through 20 ($10 < t \leq 20$) are weighted to generate the score tables T1 and T2 for both the first and second half portions taking into account the utterance fluctuation in the time direction. Moreover, this weighting is also smoothed by changing the weight smoothly with the frame number.

In step S4, the COUNT1(k, t) and the COUNT2(k, t) corresponding to the t-th label are multiplied by weights W1 and W2, respectively. Subsequently, step S5 checks for the end of the word by looking for a trailing edge signal. The frame number t is increased by 1 in step S6 if this frame is not the end of the word, and the processing returns to step S3. If it is the end of the word, the processing proceeds to step S7

In step S7, the count is normalized according to the following formula and the values of the score tables T1 and T2 for all of the labels i. That is, the probabilities P1(k, i) and P2(k, i) are determined by $$P1(k, i) = \frac{COUNT1(k, i)}{\sum_{j=1}^{N} COUNT1(k, j)}$$

$$P2(k, i) = \frac{COUNT2(k, i)}{\sum_{j=1}^{N} COUNT2(k, j)}$$

where N represents the total number of frames of the utterance.

In step S8 the smoothing between the labels is performed based upon the following formula. According to this processing, relatively stable label-producing probabilities may be obtained even without sufficient training data, even under the condition where many kinds of labels have not occurred.

$$P1'(k,j) = \sum_i P1(k,i)C(i,j)$$

$$P2'(k,j) = \sum_i P2(k,i)C(i,j)$$

where C(i, j) is a smoothing matrix satisfying C(i, j)≧0 and $$\sum_j C(i,j) = 1.$$

The smoothing matrix is based upon the distance between the labels and is shown, for example, by FIG. 6.

Figure 7D:
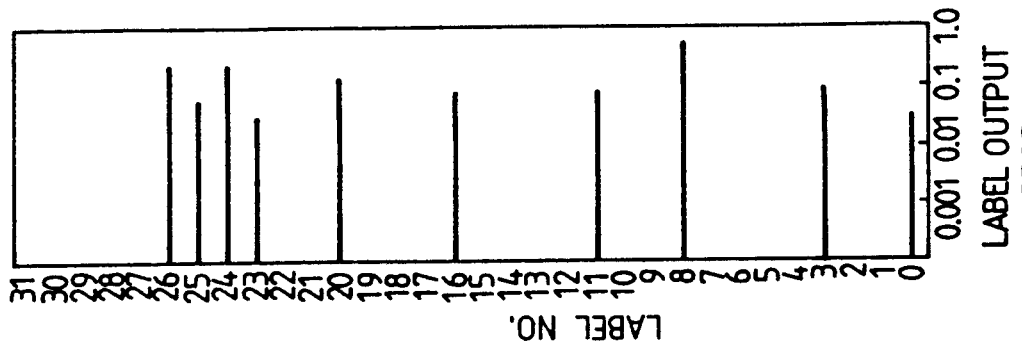
FIGS. 7C and 7D are score tables for the first half portion and the second half portion, respectively, generated based upon the utterance "Yen" in the embodiment of FIG. 1.
Figure 7C:
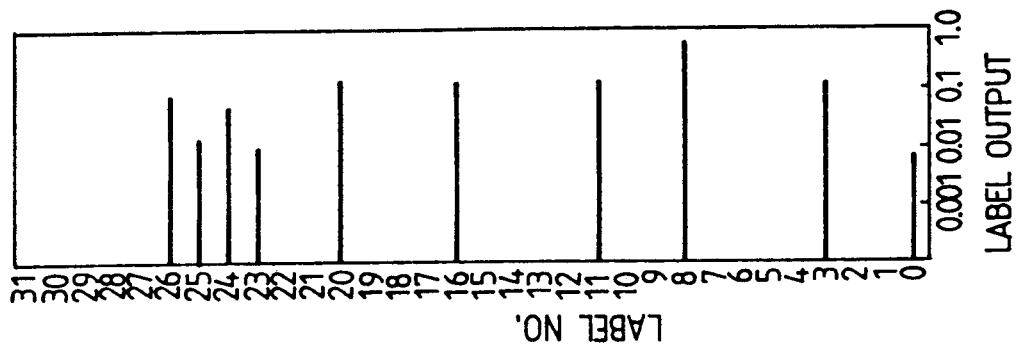
Figure 7B:
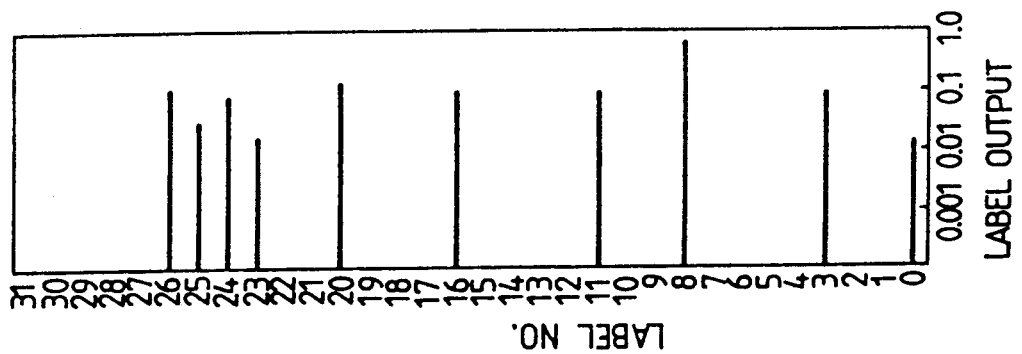
FIG. 7B is a similar score table with only smoothing between the labels.
Figure 7A:
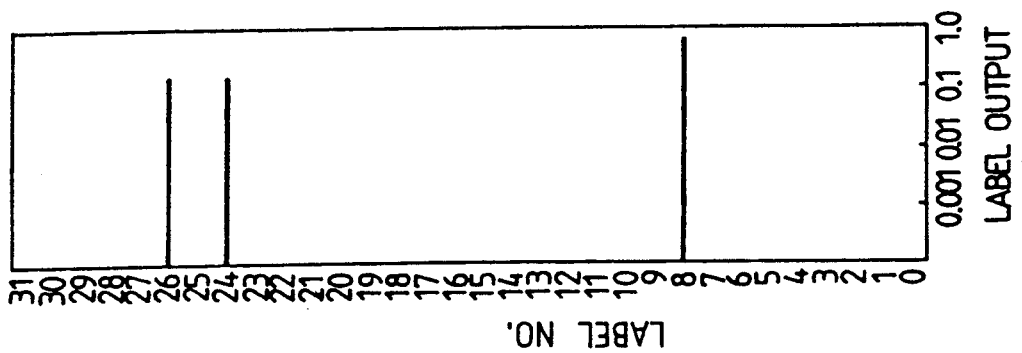
FIG. 7A is a score table generated based upon the utterance "Yen" without performing the smoothing between the labels and the division into two sections.

FIGS. 7C and 7D represent the probabilities of the score tables T1 and T2 for the first and second portions, respectively, of the utterance "Yen" according to this embodiment. In comparison, FIG. 7A represents a score table of the whole word "Yen", and FIG. 7B is that obtained by performing the smoothing processing between the labels for that of FIG. 7A. It is apparent from these Figures that the number of labels with the probability zero is decreased by the smoothing between the labels, making it possible to absorb the change in speech quality of the speaker. It is also understandable from a comparison of the score tables T1 and T2 that the probabilities of producing the third and eighth labels corresponding to /e/ are relatively large and the probabilities of producing the 23rd to the 26th labels corresponding to /N/ are small. As described above, the score tables T1 and T2 include time information. Next, the likelihood calculation block 15 in FIG. 1 will be described with reference to FIG. 8. The calculation in this block 15 is performed by using the score table T1 of the first half portion and the score table T2 of the second half portion for the 15 frames of the first half and the remaining second half portion of the inputted speech respectively.

Figure 8:
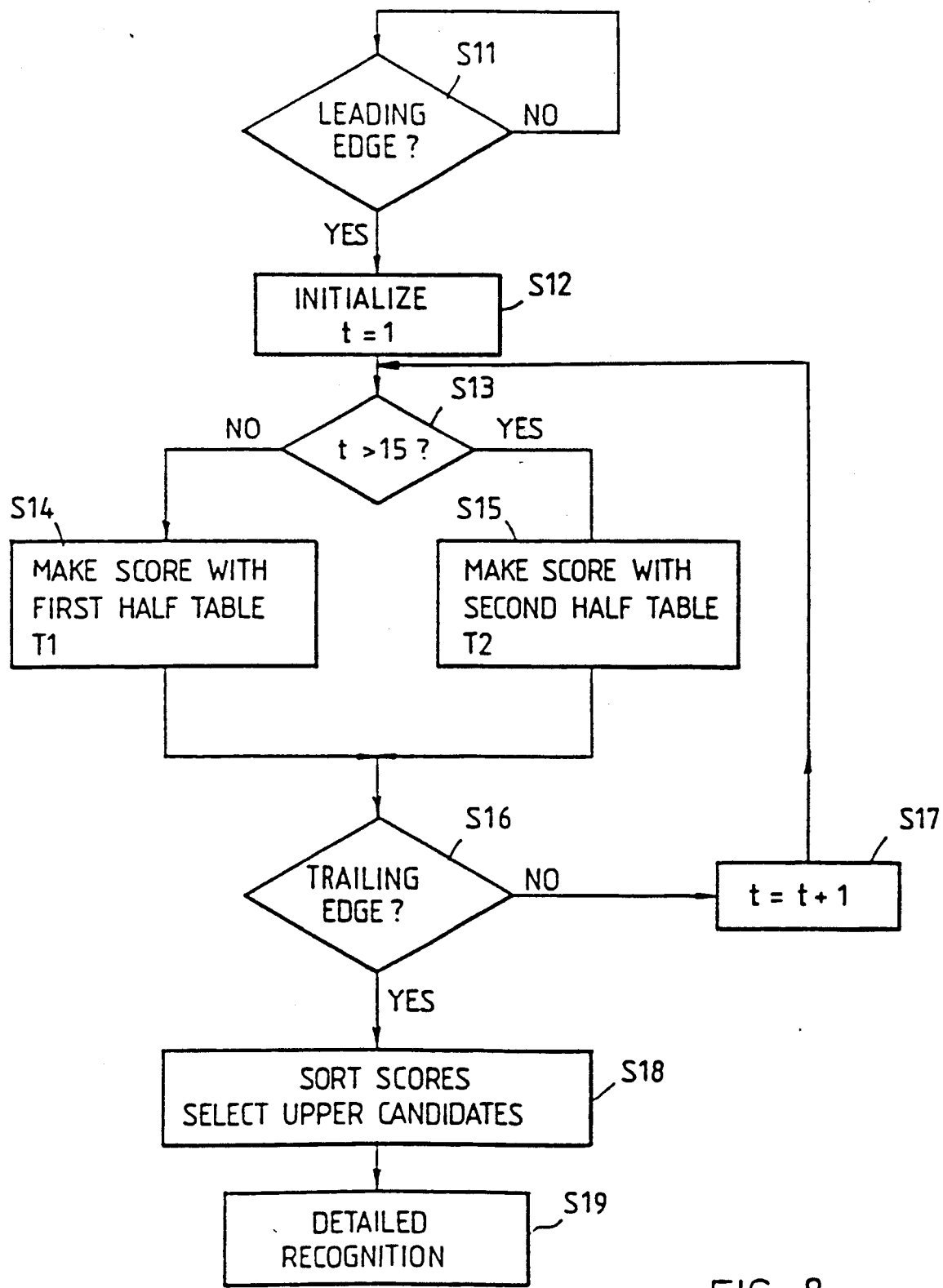
FIG. 8 is a flow chart explaining the operation of the likelihood calculation portion of FIG. 1.

In FIG. 8, step S11 prepares for detection of the start of a word. In response to the detection of a signal indicating the start of a word, an initialization is carried out so as to set the score S(k) of the word k to zero and the frame number t to 1 (step S12). In step S13, it is determined whether the frame number t exceeds the number 15 corresponding to the boundary between the first and second half portions. If the frame does not exceed 15, the processing proceeds to step S14. If the frame exceeds 15, processing proceeds to step S15.

In step S14, the probability P1'(k, t) corresponding to the probability of producing the t-th label is added to the score S(k) by using the score table T1 of the first half portion for each word. While in step S15, by using the score table T2 of the second half portion P2'(k, t) is added to the score S(k).

Thereafter, step S16 determines whether the present frame is the end of the word or not. If the frame is not the end of word, the frame number t is incremented by one in step S17. On the other hand, if the frame is the end of word, the method proceeds to step S18 where the scores S(k) are arranged in order of magnitude. Signals representing the largest M candidate words are selected and transferred to the fine recognition portion 11 (step S19).

According to this embodiment, the likelihood calculation may be performed in synchronism with labeling without waiting for the completion of the utterance, since the likelihood calculation for the preliminary selection is performed by dividing each word into a fixed length first half portion and a remaining second half portion and using the respective score tables for those portions. (In comparison, the conventional process equally divides the utterance and therefore has to wait for the completion of the whole utterance.) Furthermore, the smoothing processing is performed in preparing the score tables for the first and second half portions, thereby realizing stable preliminary selection even under utterance fluctuation in the time direction. Moreover, the smoothing between the labels makes it possible to generate better score tables even without sufficient training data.

It is to be noted here that according to this embodiment the preliminary selection block 10, the detailed recognition block 11, the word segmentation block 8, and the gate circuit 9 are embodied in software control of a personal computer. The feature extraction block 4, the labeling block 6, and the power extraction block 5 are formed with a signal processing board equipped in the personal computer. Various kinds of modifications may, of course, be possible to construct using various kinds of hardware.

I claim:

1. A speech recognition apparatus which converts inputted speech into a label for each predetermined time interval and performs speech recognition using label strings, said apparatus comprising:

a first memory means for storing, for each word in a vocabulary, a probability of producing each label in a label set at an arbitrary time interval in a fixed length first portion of an utterance of said word;

a second memory means for storing, for each word in said vocabulary, a probability of producing each label in said label set at an arbitrary time interval in a second portion following said first portion of the utterance of said word;

means for determining, upon the generation of a label for an inputted speech to be recognized, whether the label belongs to said first portion or said second portion;

means for outputting, when the generated label for said inputted speech belongs to said first portion, the probability of producing the label concerned at an arbitrary time interval in the first portion of the utterance of each word in said vocabulary wit reference to said first memory means;

means for outputting, when the generated label for said inputted speech belongs to said second portion, the probability of producing the label concerned at an arbitrary time interval in the second portion of the utterance of each word in said vocabulary with reference to said second memory means;

means for accumulating the probabilities outputted for each word;

means for specifying at least one candidate word in accordance with the magnitude of the accumulated value; and means for performing detailed recognition for each of the specified candidate words.

2. A speech recognition apparatus which converts inputted speech into a label for each predetermined time interval and performs speech recognition using label strings, said apparatus comprising:

means for accumulating, upon the generation of a label for a training utterance of each word in a vocabulary, a first and a second weight to determine the first and second statistical values of the label concerned, said first and second weights being functions of a time interval from a front edge of the utterance to the generation of the label concerned;

means for normalizing the first and second statistical values of each label in a label set for each word in said vocabulary;

a first memory means for storing the normalized first statistical value of each label in said label set for each word in said vocabulary as the probability of producing the label concerned in said label set at an arbitrary time interval in a fixed length first portion of the utterance of the word;

a second memory means for storing the normalized second statistical value of each label in said label set for each word in said vocabulary as the probability of producing the label concerned in said label set at an arbitrary time interval in a second portion following said first portion of the utterance of the word;

means for determining whether a label generated for an inputted speech to be recognized belongs to said first portion or said second portion;

means for outputting, when the generated label for said inputted speech belongs to said first portion, the probability of producing the label concerned at an arbitrary time interval in the first portion of the utterance of each word in said vocabulary with reference to said first memory means;

means for outputting, when the generated label for said inputted speech belongs to said second portion, the probability of producing the label concerned at an arbitrary time interval in the second portion of the utterance of each word in said vocabulary with reference to said second memory means;

means for accumulating the probabilities outputted for each word;

means for specifying at least one candidate word in accordance with the magnitude of the accumulated value; and means for performing detailed recognition processing for each of the specified candidate words.

3. A speech recognition apparatus according to claim 2, wherein said first weight becomes gradually smaller and said second weight becomes gradually larger as the time interval between the front edge of the utterance to the generation of the label increases at least as long as said label generation time point is around the boundary between said first and second half portions.

4. A speech recognition apparatus according to claim 3, wherein, upon the generation of a label for said training utterance, said first weight and said second weight are accumulated for each label in said label set in response to the probability of the label concerned being confused with the generated label.

5. A speech recognition apparatus comprising:

acoustic means for receiving an utterance and producing label signals in response to the utterance, said label signals being selected from a set of label signals;

first memory means for storing, for each word k in a vocabulary and for each label signal i in the set of label signals, a signal $P_1(k, i)$ representing the probability of producing the label signal i in a first portion of an utterance of the word k;

second memory means for storing, for each word k in the vocabulary and for each label signal i in the set of label signals, a signal $P_2(k, i)$ representing the probability of producing the label signal i in a second portion of an utterance of the word k following the first portion of the utterance of the word;

means for selecting, from the label signals produced by the acoustic means, a series of label signals representing the utterance of an inputted speech to be recognized, said inputted speech having a first portion and a second portion following the first portion, each label signal corresponding to the first portion or the second portion of the inputted speech;

means for outputting probability signals $P_1(k, i)$ from the first memory means for label signals corresponding to the first portion of the utterance of the inputted speech to be recognized for each word k in the vocabulary;

means for outputting probability signals $P_2(k, i)$ from the second memory means for label signals corresponding to the second portion of the utterance of the inputted speech to be recognized for each word k in the vocabulary;

means for accumulating the output probability signals for each word k to produce a likelihood signal for each word, each likelihood signal having a magnitude; and means for selecting a candidate word in accordance with the magnitude of the likelihood signals and producing a word output signal representing the candidate word.

6. A speech recognition apparatus as claimed in claim 5, characterized in that:

the means for selecting a candidate word comprises means for selecting at least two candidate words in accordance with the magnitude of the likelihood signals and producing a candidate word output signal representing each candidate word; and the apparatus further comprises means for matching the inputted speech to be recognized against each of the specified candidate word output signals to produce a recognition word output signal representing the inputted speech to be recognized.

7. A speech recognition apparatus as claimed in claim 6, characterized in that:

the second portion of the utterance of each word is the remainder of the word following the first portion of the utterance of the word; and the second portion of the utterance of the inputted speech is the remainder of the inputted speech following the first portion of the utterance of the inputted speech.

8. A speech recognition apparatus as claimed in claim 7, characterized in that:

the first and second portions of each word in the vocabulary overlap during an overlap time interval at the end of the first portion and at the beginning of the second portion; and both means for outputting probability signals apply weighting factors to output probability signals $P_1(k, i)$ and $P_2(k, i)$ for label signals i corresponding to overlap time intervals.

* * * * *